United States Patent [19]
Brockmann et al.

[11] 4,346,266
[45] Aug. 24, 1982

[54] HYBRID CIRCUIT

[75] Inventors: Klaus-Dieter K. Brockmann; Teunis A. van Harreveld, both of Hilversum, Netherlands

[73] Assignee: U.S. Philips Corporation, New York, N.Y.

[21] Appl. No.: 142,305

[22] Filed: Apr. 21, 1980

[30] Foreign Application Priority Data

May 11, 1979 [NL] Netherlands ......................... 7903709

[51] Int. Cl.³ .............................................. H04B 1/58
[52] U.S. Cl. .......................... 179/170 NC; 179/170 D
[58] Field of Search ......... 179/170 D, 170 T, 170 NC

[56] References Cited

U.S. PATENT DOCUMENTS

| | | | |
|---|---|---|---|
| 3,480,742 | 11/1969 | Gaunt, Jr. .................... | 179/170 NC |
| 3,751,602 | 8/1973 | Breeden ........................... | 179/1 HF |
| 3,875,350 | 4/1975 | Fischer ........................... | 179/170 D |

FOREIGN PATENT DOCUMENTS 2137201  2/1973  Fed. Rep. of Germany ... 179/170 D

Primary Examiner—John H. Wolff
Assistant Examiner—Randall P. Myers
Attorney, Agent, or Firm—Thomas A. Briody; William J. Streeter; Laurence A. Wright

[57] ABSTRACT

A hybrid circuit for coupling a two wire transmission path to a receive path and a transmit path of a four-wire transmission path comprises a receive port, a transmit port, and a two-wire port. The receive port is connected to a non-inverting input of a differential amplifier whose output is connected via a winding of a transformer to an impedance. The inverting input of amplifier is connected via a winding to the junction of winding and impedance. The transmit port is connected via a winding W3 to the junction of winding and impedance. The two wire port is connected to a winding on the transformer.

Signals applied to the receive port are coupled to the two-wire port but produce voltages across the impedance and winding which cancel to the transmit port whereas signals applied to the two-wire port are transferred to the transmit port. The use of the amplifier enables a smaller transformer to be used.

2 Claims, 2 Drawing Figures

HYBRID CIRCUIT

The invention relates to a hybrid circuit for coupling a two-wire port having a two-wire transmission path to a transmit port and to a receive port for the connection of the transmit path and the receive path of a four-wire transmission path to said two-wire port comprising a transformer having a plurality of windings.

BACKGROUND OF THE INVENTION

By means of hybrid circuits having transformers, the two-wire path, for example a subscriber's line, can be d.c. isolated from the four-wire switching network of a telephone exchange.

Conventional transformers for signal transmission having a low attenuation and a low distortion at low frequencies, are very bulky.

It is an object of the invention to provide a hybrid circuit having a small-size transformer whose performance with respect to the signal transmission is at least comparable with that of the conventional transformers.

SUMMARY OF THE INVENTION

The hybrid circuit according to the invention is characterized in that the receive port is connected to an input of a differential amplifier whose output is connected to one end of a first winding the other end of which is connected to an impedance, a second input of the differential amplifier which forms a differential input in conjunction with the first input being connected to one end of a second winding the other end of which is connected to the junction of the first winding and the impedance and to one end of a third winding the other end of which is connected to the transmit port and that the two-wire port is connected to a fourth winding.

BRIEF DESCRIPTION OF THE DRAWINGS

The invention with its advantages will now be further explained with reference to the wherein.

DESCRIPTION OF THE PREFERRED EMBODIMENTS

Figure 1:
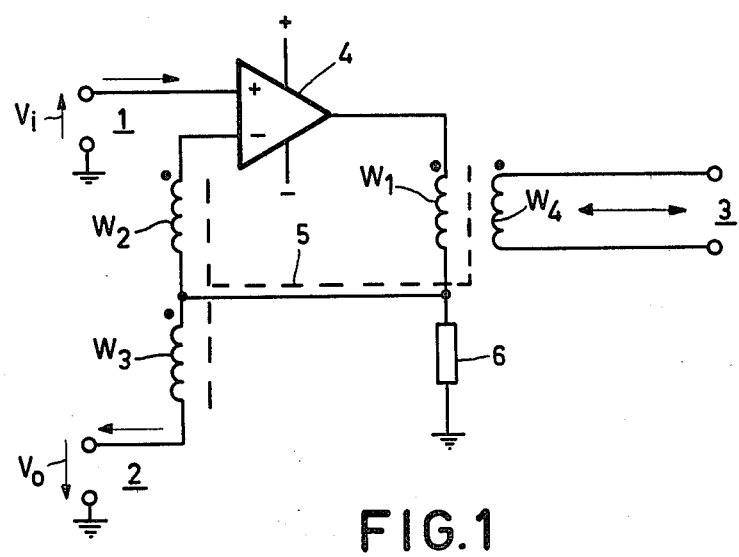
FIG. 1 shows an embodiment of the hybrid circuit according to the invention.

In FIG. 1 reference numeral 1 denotes the receive port and 2 the transmit port of a four-wire transmission path which are to be coupled with a two-wire port 3. In a practical situation, a subscriber's line of a telephone subscriber may be connected to port 3 and the four-wire transmission path may constitute the entrance to the four-wire switching network of a time-division multiplex telephone exchange.

The hybrid circuit comprises a differential amplifier 4 and a transformer 5. The transformer 5 has four windings $W_1$-$W_4$ whose relative winding senses are indicated by means of dots. The end of a winding, indicated by a dot is referred to the first end and the other end as the second end.

The receive port 1 is connected to the noninverting input of differential amplifier 4. The output of differential amplifier 4 is connected to the first end of winding $W_1$ the second end of which is connected to an impedance 6. The inverting input of differential amplifier 4 is connected to the first end of winding $W_2$, the second end of which is connected to the impedance 6 and to the first end of winding $W_3$. The second end of winding $W_3$ is connected to the transmit port 2. The two-wire port 3 is connected to winding $W_4$.

In the balanced condition the voltage produced across the impedance 6 in response to the input voltage $V_i$ of receive port 1 is equal to the voltage of winding $W_3$. In a direction towards the transmit port 2 these voltages cancel. The result is that in response to the voltage $V_i$ no voltage $V_o$ is present at transmit port 2. This balanced condition is obtained when a balance condition is satisfied.

The balanced condition is obtained when the value $Z_b$ of impedance 6 in FIG. 1 satisfies the equation:

$$Z_b = \frac{n_1 n_3}{n_4^2} Z_3 \qquad (1)$$

where $Z_3$ represents the impedance which is externally connected to two-wire port 3 and $n_1$, $n_3$, $n_4$ represent the number of turns of the windings $W_1$, $W_3$ and $W_4$.

The internal impedance $Z_i$ of the hybrid circuit as viewed from the two-wire port 3 is defined by:

$$Z_i = \frac{n_4^2}{n_1 n_2} Z_b \qquad (2)$$

When $Z_b$ satisfies the balance condition (1) expression (2) changes into:

$$Z_i = \frac{n_3}{n_2} Z_3 \qquad (3)$$

so that the hybrid circuit is matched to the impedance of the line connected to the two-wire port 3, when $n_3 = n_2$.

When losses in the transformer are neglected the voltage gain from the receive port 1 to the two-wire port 3 is equal to $n_4/(n_2+n_3)$ and from the two-wire port 3 to transmit port 2 equal to $(n_2+n_3)/n_4$. The product of these voltage gains is equal to unity. When the losses are considered the loop gain is smaller than unity which results in a stable behaviour of the hybrid circuit.

In a practical case the following winding ratio was chosen:

$$n_1 : n_2 : n_3 n_4 = 4 : 1 : 1 : 4 \qquad (4)$$

Winding ratio (4) results in a voltage gain from the receive port 1 to the two-wire port 3 equal to two, or 6 dB. The voltage gain from the two-wire port 3 to the transmit port 2 becomes equal to 0.5 or −6dB. The expressions (1) and (3) change into $Z_b = Z_3/4$ and $Z_i = Z_3$.

In the hybrid circuit shown in the accompanying drawings the winding resistances of the windings of the transformer affect the transfer characteristic to a lesser degree than in the conventional hybrid circuits. The attenuation resulting from the winding resistance of winding $W_1$ is compensated for by the gain of amplifier 4. As a consequence of the feedback via winding $W_2$. The winding resistance of winding $W_2$ has little influence because only the very low input current of the differential amplifier 4 flows through this resistance. For the same reason the winding resistance of winding $W_3$ has little influence when the input impedance of the circuit connected to the transmit port 2 is high enough. Such a high input impedance can if so desired, be realized by means of an operational amplifier which is connected as a voltage-follower.

The insertion loss will be slightly affected by the winding resistance of winding $W_4$ but is mainly determined by winding ratios which are accurately reproducible.

Figure 2:
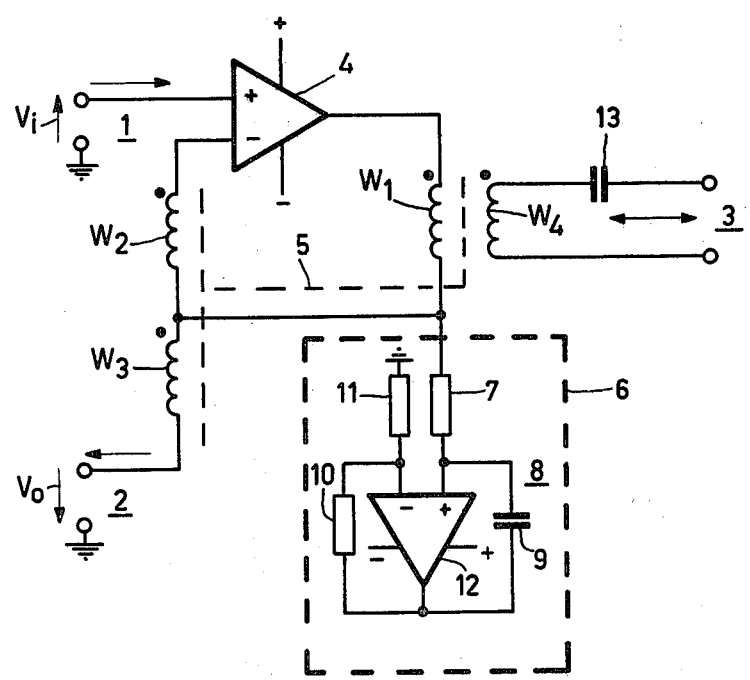
FIG. 2 shows an elaboration of the embodiment of FIG. 1.

When the hybrid circuit is connected to a subscriber's line which may carry DC-feed and signalling signals it may be desired to include a capacitor 13 (FIG. 2) in series with the two-wire port 3. This capacitor will affect the transfer characteristic to some extent. This influence can be compensated for, at least partly, by an opposite frequency-dependence of impedance 6. In the example of FIG. 2, impedance 6 comprises an impedance 7 and an impedance 8, arranged in series.

The impedance 7 simulates the impedance $Z_3$, which is externally connected to two-wire port 3. So the impedance 7 satisfies expression (1). The impedance 8 is the input impedance of a differential amplifier 12 which has feed back paths from its output to its inputs through a capacitor 9 and through the resistors 10 and 11. This arrangement forms an impedance which has a frequency-dependence which is opposite to that of capacitor 13. Compensation is achieved when the equation:

$$\frac{R10}{R11} \cdot C9 = C13 \quad (5)$$

is satisfied.

In the equation (5) R10, R11 represent the resistance values of resistors 10 and 11 and C9 and C13 represent the capacitance values of the capacitors 9 and 13.

What is claimed is:

1. A hybrid circuit for coupling a two-wire port having a two-wire transmission path to a transmit port and to a receive port for the connection of the transmit path and the receive path of a four-wire transmission path to said two-wire port comprising:

a transformer having a plurality of windings, a differential amplifier, and an impedance, said receive port being connected to a first input of said differential amplifier whose output is connected at one end of a first winding of said transformer the other end of said first winding being connected to said impedance, a second input of said differential amplifier which forms a differential input in conjunction with the first input being connected to one end of a second winding of said transformer the other end of said second winding being connected to the junction of said first winding and said impedance and to one end of a third winding of said transformer, the other end of said third winding being connected to said transmit port, said two-wire port being connected to a fourth winding of said transformer, wherein the winding senses of said transformer windings are such that the voltage produced across said impedance subtracts from that induced in said third winding as a result of an input signal applied to said receive port.

2. A hybrid circuit as claimed in claim 1, wherein said impedance comprises means for compensating for the effect of a capacitor arranged in series with said two-wire port on the impedance transfer characteristic.

* * * * *